(12) United States Patent
Laden et al.

(10) Patent No.: US 9,392,457 B2
(45) Date of Patent: Jul. 12, 2016

(54) METHOD AND APPARATUS FOR SELF-ACTIVATING A MOBILE DEVICE

(71) Applicant: Cellco Partnership, Basking Ridge, NJ (US)

(72) Inventors: Matthew M. Laden, Masaryktown, FL (US); Elena Krimchansky, New City, NY (US)

(73) Assignee: Cellco Partnership, Basking Ridge, NJ (US)

( * ) Notice: Subject to any disclaimer, the term of this patent is extended or adjusted under 35 U.S.C. 154(b) by 57 days.

(21) Appl. No.: 14/092,078

(22) Filed: Nov. 27, 2013

(65) Prior Publication Data

US 2015/0148020 A1    May 28, 2015

(51) Int. Cl.
| | | |
|---|---|---|
| H04M 3/00 | (2006.01) | |
| H04M 11/00 | (2006.01) | |
| H04W 12/06 | (2009.01) | |
| H04W 12/08 | (2009.01) | |
| H04W 8/18 | (2009.01) | |
| H04W 48/02 | (2009.01) | |

(52) U.S. Cl.
CPC .............. *H04W 12/06* (2013.01); *H04W 12/08* (2013.01); *H04W 8/18* (2013.01); *H04W 48/02* (2013.01)

(58) Field of Classification Search
CPC ....... H04W 4/001; H04W 8/18; H04W 8/183; H04W 8/245; H04W 8/265
USPC .................. 455/407, 418–420; 709/217–219; 717/168–178
See application file for complete search history.

(56) References Cited

U.S. PATENT DOCUMENTS

| | | | | |
|---|---|---|---|---|
| 6,510,515 | B1* | 1/2003 | Raith | 713/163 |
| 2004/0246965 | A1* | 12/2004 | Westman et al. | 370/392 |
| 2008/0026740 | A1* | 1/2008 | Netanel | 455/419 |
| 2010/0159899 | A1* | 6/2010 | Horn | H04L 63/10 455/414.1 |
| 2010/0271975 | A1* | 10/2010 | Qiu et al. | 370/254 |
| 2011/0134843 | A1* | 6/2011 | Noldus et al. | 370/328 |
| 2012/0071152 | A1* | 3/2012 | Roundtree et al. | 455/419 |
| 2012/0096162 | A1* | 4/2012 | Cecilia Torralba et al. | 709/225 |
| 2012/0157047 | A1* | 6/2012 | Chen et al. | 455/411 |
| 2013/0019012 | A1* | 1/2013 | Henrikson et al. | 709/225 |
| 2013/0125205 | A1 | 5/2013 | Hsu et al. | |
| 2013/0237203 | A1* | 9/2013 | Oertle et al. | 455/418 |
| 2014/0254584 | A1* | 9/2014 | Rajapandiyan et al. | 370/352 |
| 2015/0065105 | A1* | 3/2015 | Masterson et al. | 455/418 |

* cited by examiner

*Primary Examiner* — Rafael Pérez-Gutiérrez
*Assistant Examiner* — Mark G. Pannell

(57) ABSTRACT

To activate a pre-provisioned mobile device on a network, an initial data communication for device activation is allowed between the device and an self-activation portal. At this point, the network prevents other more regular communication of the mobile device via the network. The portal automatically collects identification information from the mobile device and collects information from the user to activate the device on a network service account. The portal causes a provisioning system to provision data to network elements to activate device service in the network. After provisioning is complete, a notification is sent to the mobile device; and after device communication is completed a record that controlled routing to the portal before activation is deleted. The mobile device then communicates via the network to obtain data for storage in the device, to complete activation and permit normal operation of the mobile device via the network.

14 Claims, 8 Drawing Sheets

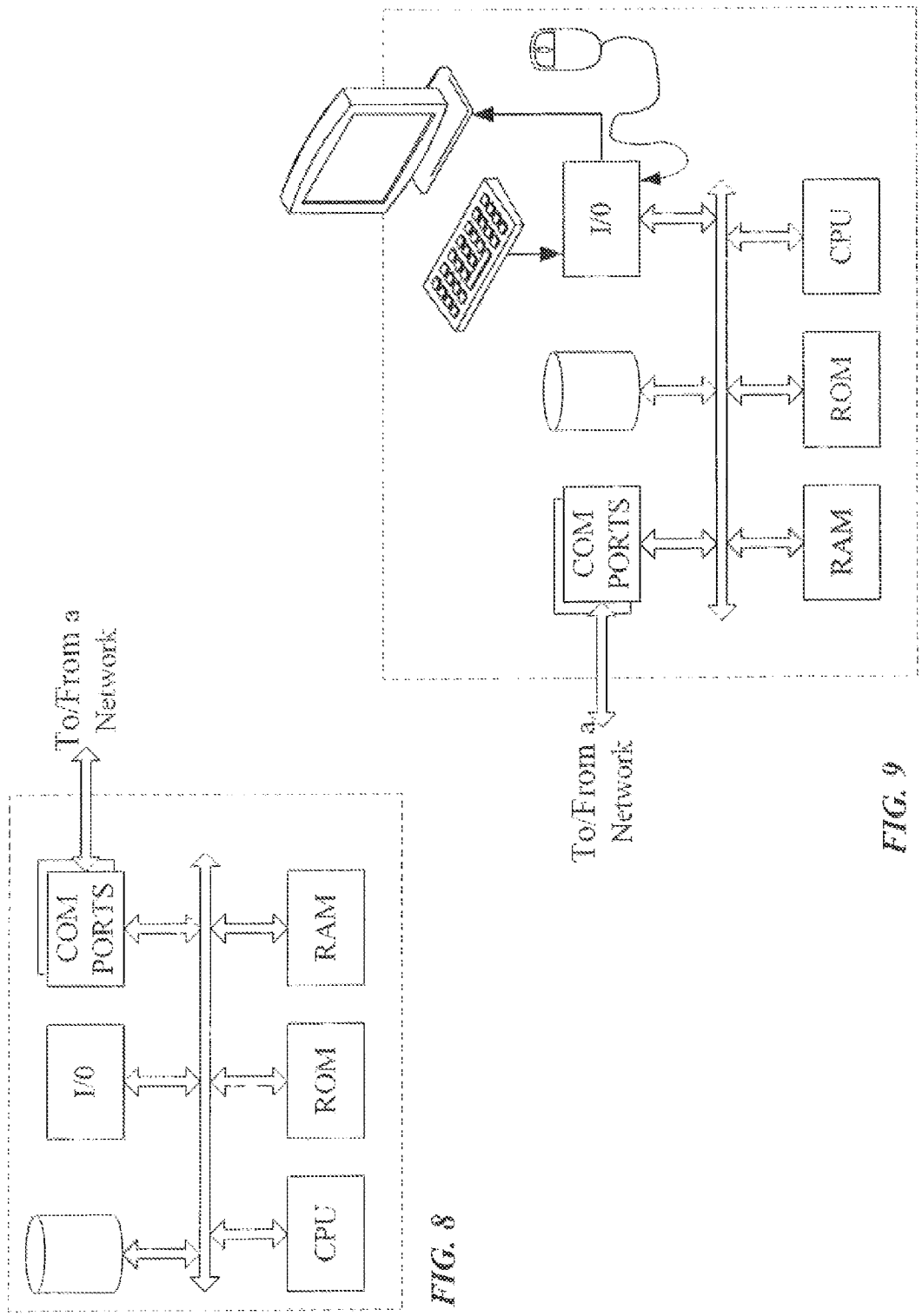

METHOD AND APPARATUS FOR SELF-ACTIVATING A MOBILE DEVICE

BACKGROUND

In recent years, mobile wireless communications have become increasingly popular. Presently, mobile devices such as laptops, personal digital assistants ("PDAs"), smartphones, cell phones, tablet PCs and other portable computers are rapidly gaining popularity. Mobile devices are available with interfaces enabling communications via mobile networks or local area network (LAN) wireless access points (hereinafter "wireless hotspot networks" or "hotspots"). Currently, mobile networks are operational that conform with the fourth generation (4G) Long Term Evolution (LTE) standard. These mobile networks provide voice communication, messaging, email and internet access (for example) by using radio frequency communication. Communications via hotpots may occur using a communications standard such as IEEE 802.11 ("WiFi") network type wireless access points.

The mobile devices with capability of accessing to a mobile network and the hotspot network usually are sold at a point of sale (POS) of the mobile network carrier and activated for voice communication and data transfer at the POS at the time of purchase.

Recently, sales channels have diversified such that buyers can buy the mobile devices via websites and markets other than the POS of the mobile network carrier. In these later purchase channels, a buyer purchases only a mobile device via a website or another non-carrier market without buying a data plan to access the mobile network. Therefore the buyer needs to activate the mobile device on the buyer's own by buying the data plan of the mobile network or adding the device to an existing plan (e.g. instead of or in addition to other devices of the user). To facilitate this type of self-activation by a user, the mobile devices thus should have a limited accessibility to only websites or platforms of the appropriate mobile network carrier for activation of the mobile devices. General access via the hotspot or mobile network becomes available only after activation. Existing activation technologies, particularly for devices compatible with 4G LTE mobile networks, have not supported this limited access for self-activation.

In another scenario, a mobile device user has a previously activated mobile device with a prepaid voice and/or data plan for the mobile network. In such a case, the user is not allowed access to the mobile network, i.e., the device is effectively de-activated, when the prepaid balance has been used up. It would be desirable, from the standpoint of both the mobile network carrier and the user, to provide limited user access to only a website or platform of the carrier for the user to buy another prepaid voice and/or data plan (to "replenish" the prepaid amount). It would further be desirable, from the standpoint of the carrier to restrict the user's access to voice access and other websites until the device is re-activated.

In both cases, even if the mobile device tries to connect to an IP session with other websites (such as "Google" or "Yahoo"), a mobile device having limited access will need to go only to the website or platform of the mobile network carrier for activation of the mobile device.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 8 provides a block diagram of a general purpose computer hardware platform that may be configured as a host or server, for example, to function as any of the server computers shown in FIGS. 1 and 3.

FIG. 9 is a simplified functional block diagram of a personal computer or other work station or terminal device.

DETAILED DESCRIPTION

Figure 1:
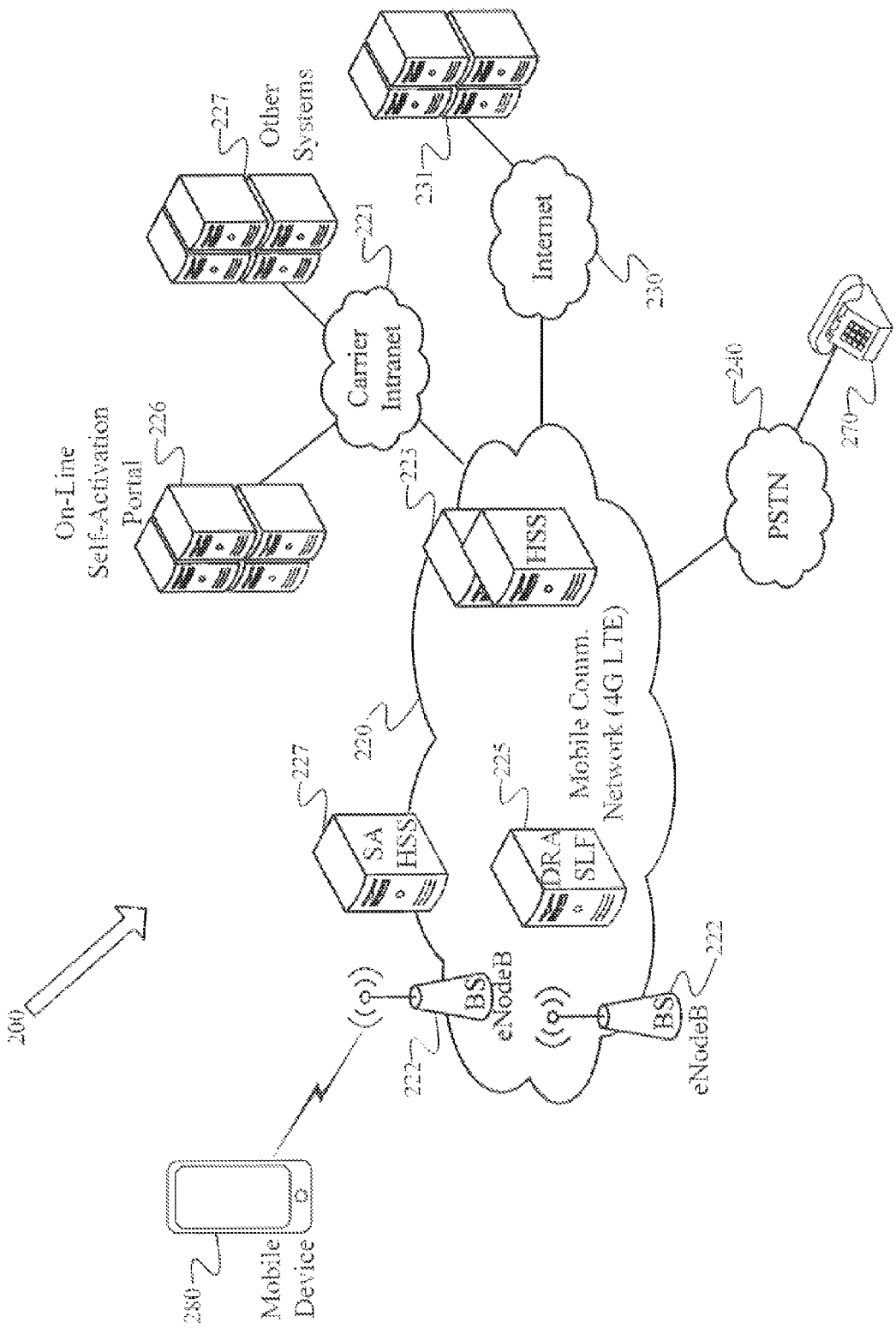
FIG. 1 is a functional block diagram of an exemplary system which may implement a method for directing a data communication session of a mobile device to a web portal or platform of a wireless network for self-activation.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The examples described in detail below relate to a method and a system for permitting a customer to self-activate a mobile device. Upon request for a session before full activation, the mobile device session is redirected, e.g. to an self-activation portal. The network is configured to limit access prior to full activation to communications with just that portal. The communications with the portal, however, support activating the mobile device and communicating to the user that activation is complete. Part of the activation procedure, for example, configures one or more network elements to provide service for the device in a normal unrestricted manner. When provisioning is complete, including the provisioning of the network element(s) for normal unrestricted access, the restricted access configuration used to establish the session with the self-activation portal is removed.

For example, if a mobile device that is not currently allowed full network communication (e.g. not presently active or with insufficient prepaid balance) sends a data communication request out to access a desired website, that mobile device is redirected to the portal. Using this portal, the mobile device goes through a procedure to become fully authorized for communication via the cellular network. In an example, the mobile device is able to be activated by the cellular network with a postpaid plan or the user is allowed to buy a prepaid plan for initial or continued communication via the cellular network. The redirection mechanism efficiently and precisely redirects the mobile device, which is not authorized for communication via the cellular network, to the web portal or other platform of the cellular network so that the mobile device can be activated. Activation of the mobile device may occur, for example, on a 4G LTE network.

In general, provisioning is a process for providing data about a mobile device and/or about a network and a user account, so as to associate the mobile device with a network/carrier user account, so the mobile device can connect to the network and operate and obtain services through the network. Such provisioning, for example, may involve entry or modification of account information with the network service provider/carrier to add the mobile device, establish permissions or policies applicable to the device in one or more control elements in the network and/or storing some requisite data (e.g., an identifier assigned by the network operator, control data, etc.) in the mobile device itself.

In the examples, notice of completion of provisioning is provided to the mobile device at the end of activation processing through the self-activation portal. In response, the mobile device is powered off and powered back on or may need to re-register, so as to trigger an over the air communication to obtain any data the device may need to provision the device itself. Afterward, the mobile device is ready and the network is configured so as to provide regular access to the communication services to which the device user subscribes.

Reference now is made in detail to the examples illustrated in the accompanying drawings and discussed below. FIG. 1 is a functional block diagram of an exemplary system 200 that supports various mobile communication services and which may implement a method for directing a communication of a mobile device to a web portal or platform of a wireless network for self-activation. The illustrated system services any number of mobile devices, including the Illustrated Mobile Device 280. Mobile Device 280 may be a laptop, a personal digital assistant ("PDA"), a smartphone, a tablet PC or another portable device designed to communicate via a wireless network. The mobile device 280 in our example corresponds to a smartphone or tablet itself having network communication capability and a user interface, which in this discussion, may be used in the self-activation procedures. Although not shown for simplicity, the present activation techniques also may be used to activate other types of devices onto the network, for example, to activate mobile broadband devices like Jetpacks or USB dongles that provide service connectivity for other types of data devices (e.g. non-mobile/wireless computers or the like) and to activate an increasing variety of mobile network connected devices (e.g. cameras, e-Readers, etc.) that themselves may lack the hardware or programming to support a browser type user interface over the wireless network.

The illustrated system example includes a mobile communication network 220, in this case, operated in accordance with 4G LTE standards. Mobile network 220 may provide mobile telephone communications as well as Internet data communication services. For example, mobile network 220 may connect to the public switched telephone network (PSTN) 240 (eventually connecting to PSTN device 270) and public packet-switched data communication networks such as the Internet 230. Data communications via mobile network 220 provided for users of devices like 280 may support a variety of services such as communications of text and multimedia messages, email, web browsing, streaming or downloading content, etc. with network connected equipment represented generically by the server 231 in the drawing. Voice communication also may involve transport via the Internet 230 using voice over Internet Protocol (VoIP) technologies.

Mobile Device 280 may connect to mobile network 220 through a cellular base station 222, two of which appear in the drawing by way of example.

For convenience only, the drawings and description use terms like base station (BS) originally developed to describe elements of older mobile network technologies. The terms are used here, however, in a broader sense to also encompass equipment used for similar wireless link and routing/control purposes in more modern network technologies. In a 4G wireless network, for example, each wireless access node corresponding to one of the illustrated base stations may take the form of a node referred to as an eNodeB, and the wireless mobile devices are types of user equipment (UE) devices. Packet routing and control functions may be implemented in packet routers and/or associated server platforms in the radio access network (RAN) or in many cases in elements of an IP Multimedia Service (IMS) core network (not shown separately) coupled to some number of 4G RANs, although such routing and control elements(s) are generically included in the broad class of devices that may be used to implement the network functionality discussed here.

The carrier that operates the network 220 will also utilize a variety of other systems for related purposes, such as maintenance, accounting and provisioning. In the example, the carrier has another data network, e.g. Intranet 221, that provides data communications for other data systems used by the carrier, and that network 221 has connectivity into the network 220 that provides the actual communications services to the carrier's customers. For purposes of the present discussion, equipment communication via the network 221 includes an self-activation portal 226 as well as a number of other systems that will be involved in provisioning and the like in the self-activation process. The other systems for provisioning, etc. are shown collectively at 227 in FIG. 1, although more specific examples are discussed later (e.g. with regard to FIGS. 3 and 5-7).

The portal 226, in the examples, is a web server functionality implemented on one or more network connected computers. The portal 226, for example, provides a landing page and any number of additional pages, in this case, configured to support the self-activation procedure. The pages accessible from the portal 226 may also support other interactions between customers and the carriers' systems, e.g. for access to billing and account related information. For purposes of the present discussion at least, we will assume that any access to pages for other interaction(s) still has some relationship to self-activation, e.g. to assist the user to add a newly activated device to an existing account or replace an old device on the account with the new device.

For authentication and authorization purposes, the network 220 includes a number of home subscriber servers. A home subscriber server (HSS) is an example of a computer or the like that maintains account or customer related service profile records associated with mobile devices that are allowed access to communication service through the mobile network. Of note for purposes of the present discussion, the HSS operates as a control point for providing instructions to other network elements, based on the profile records, so that the network delivers communications services to the mobile devices in accordance with the respective profile records.

In the network 220 in our example, an HSS is a platform that stores a database of profile records for mobile devices 280 authorized for service through the network 220. An HSS provides data upon request to enable session control elements (not separately shown) to control the flow of sessions through the 4G LTE network 220 for the mobile devices, e.g. to authenticate a particular mobile device and to indicate that the mobile device is or is not authorized to utilize a particular network service. The HSS profile record for a mobile device may include relevant identification information, subscription information and possibly information about the location of the device and/or IP (Internet Protocol) address assignment information. A large network deployment, for serving a substantial number of mobile devices includes a number of actual call processing HSS servers, two of which are shown at 223 in the drawing. Each activated mobile device will have a record stored in one of the databases of the HSS servers 223. The network 220 will not provide service to a mobile device unless the mobile device has a record in an HSS and may even terminate an ongoing session when a record for the mobile device is deleted from an HSS.

During actual processing of a call session, a server configured as a Subscriber Location Function (SLF) identifies which of the HSSs 223 to use for services of a particular mobile device. The example network 220 uses a Diameter Routing Agent (DRA) as the implementation of the SLF function, as shown at 225 in FIG. 1. Each activated mobile device will have an entry in the mapping table(s) of the DRA SLF 225 to point to the one of the HSSs 223 having the service profile record for that device.

As discussed more later, with regard to FIG. 2, the mobile device 280 includes an identity a Universal Integrated Circuit Card (UICC) or module, referred to in the examples as a subscriber identity module (SIM). The SIM in the un-activated mobile device 280 is pre-provisioned, but only for restricted service sufficient to enable self-activation.

The network 220 also includes an HSS for self-activation (SA HSS) 227. For a mobile device 280 that is not activated at the present time, there will not be a record to define service for that the SIM for that mobile device 280 on an HSS 223 stored in the DRA SLF 225. However, the DRA SLF 225 is configured with default routing information so as to route authentication and authorization related communications for such an un-activated mobile device 280 to the SA HSS 227. Assuming that the device 280 has a pre-provisioned SIM, there will be a record for that SIM in the SA HSS 227. The record for the mobile device 280 in that HSS 227, however, supports only restricted network access for the mobile device. In operation, when the user turns on the presently not activated mobile device 280 within the network footprint and attempts a data communication, a session control element will signal the DRA SLF 225 to identify an HSS, and the DRA SLF 225 will identify the SA HSS 227. The session control element will then query the SA HSS 227 regarding authentication/authorization; and based on the device record in that HSS 227, the HSS 227 will instruct that session control element to route the user's data sessions to the self-activation portal 226.

The pre-provisioning of SIMs without active subscriber accounts will assure that the device will be able to authenticate and acquire an IP address and in turn be able to reach the self-activation portal 226.

During the ensuing first data communication, the portal 226 allows equipment of the cellular network provider to obtain sufficient information so that use of a cellular network can be permitted and billed. During later data communications, a cellular network provider permits use of the cellular network 220 and bills for that use accordingly. The subsequent full service data communication is prevented until first data communication has been successfully completed. Use the words "billed" and "bills" encompassed various plans for prepayment for service, postpayment for service, as well as any combination of prepayment and postpayment.

It may help to briefly explain how such a procedure might appear from the device user's perspective. When an customer purchases a mobile device 280 equipped with a 4G SIM and turns that device 280 on, while in the 4G LTE footprint of network 220, the self-activation process will begin when the user launches the device's browser (or a browser on a device connect to device 280, e.g. if 280 is a USB dongle, etc.). Upon launch of the browser (for a device with a SIM that is pre-provisioned for self-activation) the network 220 will redirect the user's browser session to the self-activation portal 226 as outlined above.

The self-activation process is intended to involve as little data entry with respect to device identifier(s) and SIM identifier(s) as possible. As such, the self-activation portal 226 can gather this data (e.g. International Mobile Equipment Identity (IMEI), and Integrated Circuit Card ID (ICCID)) from the user equipment, e.g. as data obtained by the network 220 from a device 280 that is attempting to self-activate; and the self-activation portal 226 can pass data on when the portal triggers downstream equipment 227 involved in the account activation and related provisioning procedures.

During the procedure, the network 220 allows access to all potential web page IP addresses involved in the subscriber activation process prior to completion of the self-activation process.

After the self-activation process completes and the customer is assigned a full set of network credentials, e.g. including an MDN and/or MSISDN, a new record based on full credentials for the activated SIM is provisioned into a regular call processing HSS 223 and the pre-provisioned record for self-activation for the SIM is deleted from the SA HSS 227. An appropriate record is added to the mapping table of the DRA SLF 225 to point to the call processing HSS 223 that now has the record for the particular SIM.

Also, the user of the mobile device 280 may be given feedback as to status of the activation process after entering their information and choices. When the activation process is complete, for example, a confirmation is sent to the user's device by SMS, email address, or both.

Figure 2:
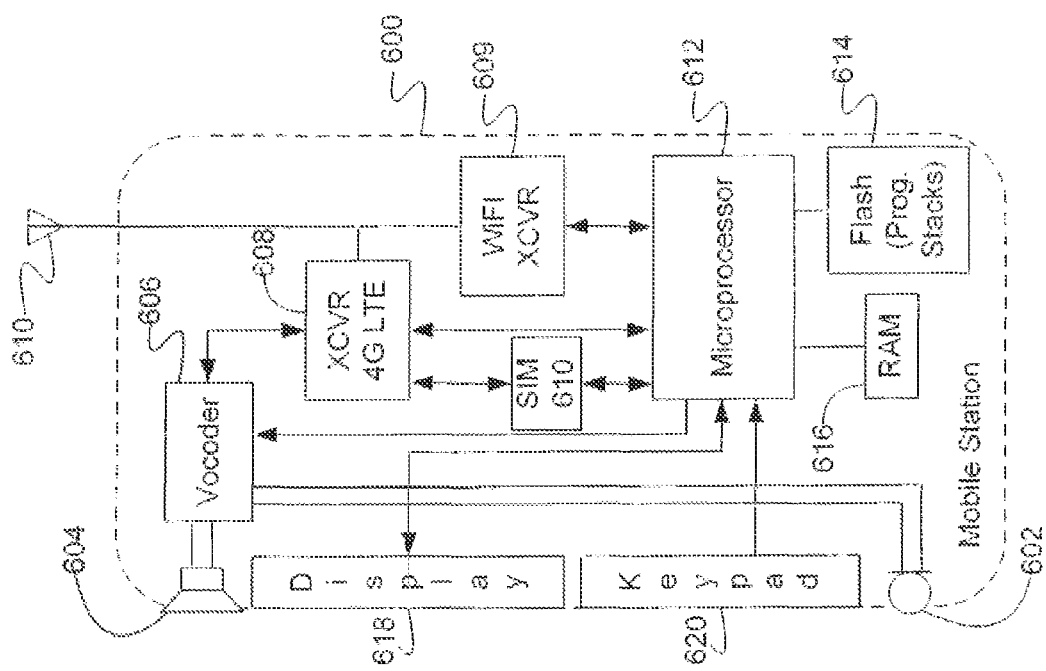
FIG. 2 provides a block diagram illustration of an example of mobile device.

FIG. 2 provides a block diagram illustration of an exemplary mobile device 600, which may be used as the Mobile Device 280.

Although mobile device 600 may be a smart-phone or a tablet PC or may be incorporated into or connected to provide data communications for another device, such as a portable personal computer, personal digital assistant (PDA), etc., for discussion purposes, the illustration shows Mobile Device 600 in the form of a handset or feature phone. The handset example of the mobile device 600 functions as a normal digital wireless telephone station. For that function, the mobile device 600 includes a microphone 602 for audio signal input and a speaker 604 for audio signal output. The microphone 602 and speaker 604 connect to voice coding and decoding circuitry (vocoder) 606. For a voice telephone call, for example, the vocoder 606 provides two-way conversion between analog audio signals representing speech or other audio and digital samples at a compressed bit rate compatible with the digital protocol of wireless telephone network communication or voice over packet (Internet protocol) communications.

For digital wireless communications, mobile device 600 also includes at least one of digital transceivers ("XCVR") 608 and 609. Mobile device 600 is a multimode device capable of operations on various technology type networks. The concepts discussed here encompass embodiments of the mobile device 600 utilizing any digital transceivers that conform to current or future developed digital wireless communication standards.

In the example, transceiver 608 is compatible with one or more standards of communication implemented in the public wide area mobile network 220. In particular transceiver 608 supports 4G LTE wireless communications over airlinks with base stations 222. The same or a different transceiver (not shown) may also support one or more other standards of communication implemented in public mobile networks, such as CDMA, 1xRTT, EvDO, GSM or UMTS, e.g. for use when operating in areas where 4G LTE service may not be available. Transceiver 609 is compatible with one or more standards of communication implemented in wireless local area networks (WLANs), such as one of the WiFi standards and/or WiMAX.

Transceiver 608 provides two-way wireless communication of information, such as vocoded speech samples and/or digital message information, in a selected one of the technology modes. Transceiver 608 also sends and receives a variety of signaling messages in support of the various voice and data services provided via the mobile device 600 and the communication network. Each transceiver 608 connects through radio frequency ("RF") send and receive amplifiers (not separately shown) to an antenna 610.

Transceiver 609 also provides two-way wireless communication of information, such as vocoded speech samples and/or digital message information, in a selected one of the technology modes. Transceiver 609 sends and receives a variety of signaling messages in support of the various voice and data services provided via the mobile device 600 and the communication network. Transceiver 609 connects through RF send and receive amplifiers (not separately shown) to an antenna 610. In the example, transceiver 609 is configured for RF communications in accord with a wireless LAN protocol (a hotspot), such as WiFi. For the network selection function, network communications via Transceiver 609 and antenna 610 may include detection of the available wireless LAN technology types in any given service area and selection of an available network for communications. Mobile device 600 may use transceiver 609 to communicate with a hotspot network, and may use transceiver 608 to communicate with cellular network 220.

The mobile device 600 may utilize a variety of different devices/technologies to implement user interface functions, for output of information to the user and input of information by the user. Many smartphones and tablets, for example, utilize touchscreen displays as (or as a part of) the user interface. For simplicity, however, the example in FIG. 2 utilizes a display and keypad.

Mobile device 600 therefore includes display 618 for displaying messages, menus, call related information dialed by the user, calling party numbers, displaying applications, images, video, and web pages, etc. Displayed information may include web pages provided via the portal 226 during the self-activation process. Keypad 620 enables dialing digits for voice and/or data calls as well as generating selection inputs, for example, as may be keyed in by the user based on a displayed menu or as a cursor control and selection of a highlighted item on a displayed screen. User input via the keypad 620, for example, may include user identification information, plan selections, etc., for communication to the portal 226 during the self-activation process. Display 618 and keypad 620 are the physical elements providing a textual or graphical user interface, in this simple example. User input/output may also be audible, e.g. via the microphone 602 and speaker 604, including during self-activation of the mobile device 600 Various combinations of keypad 620, display 618, microphone 602 and speaker 604 may be used as the physical input output elements of the GUI, for multimedia (e.g. audio and/or video) communications. Other user interface elements may be used, such as a stylus and touch sensitive display screen, as in a PDA or smart phone.

Microprocessor 612 serves as a programmable controller for the mobile device 600, in that it controls all operations of mobile device 600 in accord with programming that it executes, for all normal operations, and for operations involved in automatically detecting Internet redirection. In the example, mobile device 600 includes flash type program memory 614, for storage of various "software" or "firmware" program routines and mobile configuration settings. The mobile device 600 may also include a non-volatile random access memory (RAM) 616 for a working data processing memory. Of course, other storage devices or configurations may be added to or substituted for those in the example. In a present implementation, the flash type program memory 614 stores firmware such as a boot routine, device driver software, an operating system, call processing software and vocoder control software, and any of a wide variety of other applications, such as client browser software and short message service software. The memories 614 and 616 also store various data, such as telephone numbers and server addresses, downloaded data such as multimedia content, and various data input by the user. Programming stored in the flash type program memory 614, sometimes referred to as "firmware," is loaded into and executed by the microprocessor 612 to configure the device to implement various device functions.

The mobile device 600 will store information needed to allow that device to operate over the network 220. Although other secure storage may be used, in the example, the device 600 includes a SIM card 610. The SIM card 610 in this example is a standardized module for secure storage of a variety of different information that may be used in communications with the network 220, for example, data identifying the mobile station to the network (e.g. IMSI, MDN and/or MIN). The SIM may also store policy or operation control information such as preferred roaming lists. The SIM card can also store, for example, a user's private key, a public key, certificate or personal information. The information stored in the SIM card is tamper-resistant and secure.

The SIM card may include an interface circuit for communication with a mobile terminal in which the SIM card is installed, a control circuit, a flash memory, a ROM and a RAM. The flash memory, for example, may provide tamper resistant memory spaces, which can prevent unauthorized access to that memory space of the SIM card. For example, a SIM card may provide separate memory spaces for each application executable on the mobile terminal such that the memory space for one application is isolated and cannot be accessed by another application, by maintaining security domains in memory, as defined by the specification for SIM cards.

Information stored in the SIM card may be utilized for security, authentication or encryption purposes. For example, in addition to network authentication and authorization functions, the information in a SIM may be used for personal identification or for mobile payment. However, for security reasons, the SIM card is accessible only by a trusted server of the operator of the mobile communication service.

The SIM itself is identified by an ICCID. The ICCID includes a number up to 19 digits long including an issuer identification number, individual account identification and a check digit. The IMSI enables an operator of mobile communication network 220 (e.g., a wireless service carrier) to uniquely identify the subscriber on their network. The IMSI is tied to the corresponding telephone number so that a network of the mobile communication operator can connect phone calls with the mobile device that contains the SIM card by using the IMSI.

Figure 3:
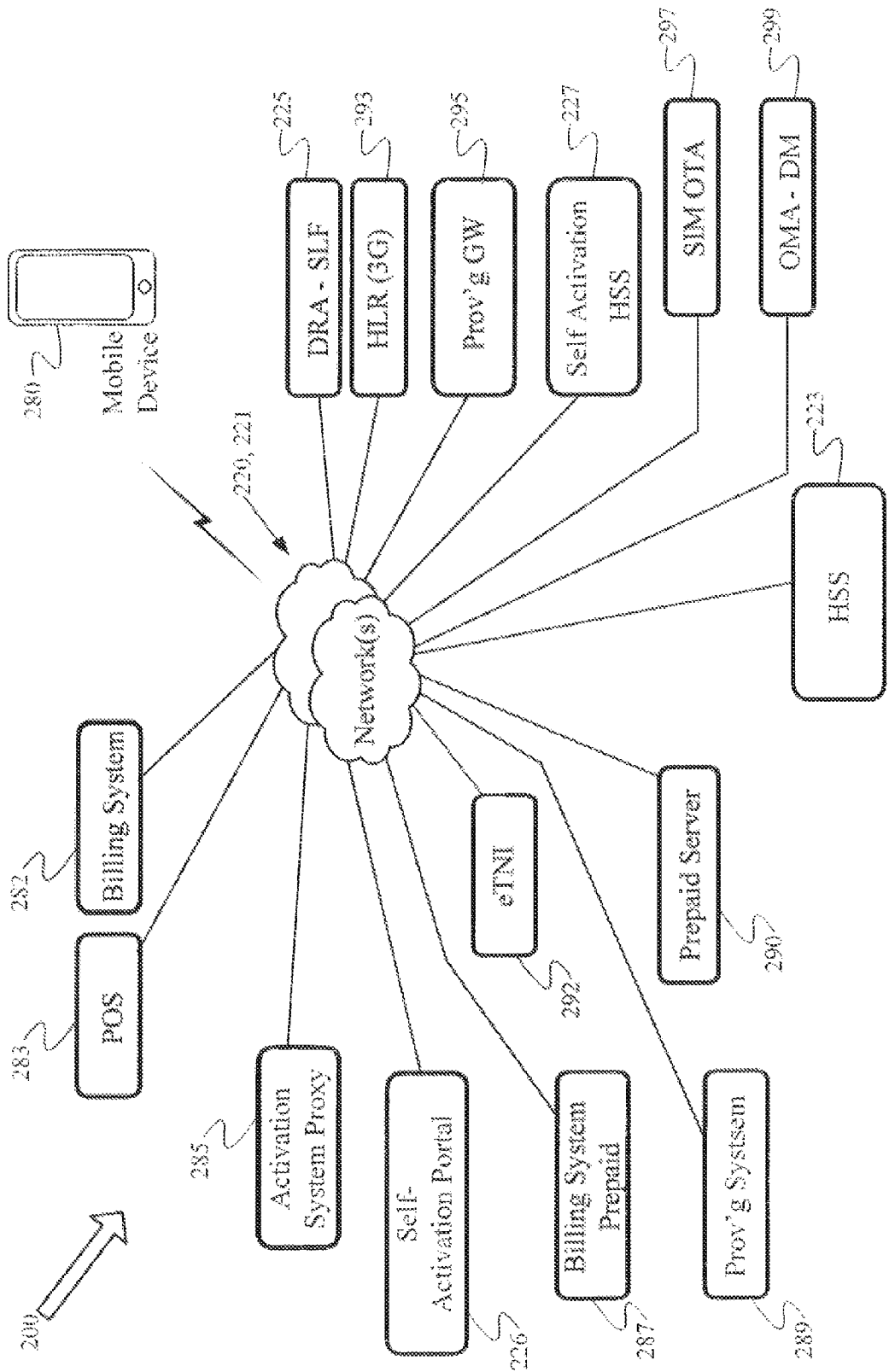
FIG. 3 provides a block diagram of another example of the network but showing a different set of the elements that may be involved in the user self-activation of mobile device.

FIG. 3 provides a somewhat different block diagram that illustrates the system 200, by way of an example, but showing examples of more elements of the system 200 for allowing mobile device 280 to be activated by a user of the device. The drawing shows the device 280, the networks 220, 221 are shown more generally as clouds (omitted elements such as the base stations), but this drawing depicts more of the carrier equipment/systems that may be involved in specific self-activation procedures discussed in more detail later (e.g. regarding FIGS. 5-7). In that regard, the DRA SLF 225 and the HSSs 223, 227 are shown outside the networks for convenience, to better illustrate their communications with other systems during provisioning for the mobile device 280.

Of note for purposes of discussion of FIG. 3, in addition to the authentication and authorization functions, the records in the DRA SLF 225 and the HSS platforms 223, 227 are managed as part of the provisioning tasks. As outlined above, a record for a pre-provisioned SIM resides in the self-activation HSS 227 prior to activation of the mobile device 280 on the network 220. As part of the provisioning process, upon self-activation, that record is eliminated from the self-activation HSS 227 and a record for the SIM is provisioned to one of the call processing HSS platforms 223. The record in the call processing HSS is populated so as to allow the device 280 full service on the network 220. The provisioning steps will also include a step to add an entry for the mobile device 280 to the mapping table in the DRA SLF 225 to point to the HSS 223 that now stores the record for the SIM of the fully activated mobile device.

Mobile device 280 communicates with the self-activation portal 226 through the networks 220, 221 as previously described with reference to FIG. 1. In particular, self-activation portal 226 receives through cellular network 220 a request, in the example, a browser session, for user initiated activation of the mobile device 280.

In addition to the elements of the system 200 discussed so far, the drawing shows a billing system 282, which, for example, may be implemented by a Virtual Information System Integrated Online Network (VISION) system. The billing system 282 is a system of one or more computers that stores account records for customers of the carrier, including data about the mobile devices activated on each account and the features/service plans applicable to the various mobile devices on the accounts. The billing system 282 also may serve as the "system of record" for device and account related information for mobile devices, for postpay accounts and possibly for prepaid accounts.

In an example that uses a single type of system, billing system 282 maintains billing information for all mobile devices that attempt to communicate via network 300. The billing system 282 maintains a record of all mobile devices that have prepaid service and the type of prepaid service that is associated with each mobile device. The billing system 282 may maintain information regarding prepay service, postpay service, or both. Thus, if Mobile Device 280 has prepaid service, billing unit 282 maintains information associated with Mobile Device 280 so that is can be confirmed that Mobile Device 280 has prepaid service. Along with other data, the information associated with Mobile Device 280 that is stored by billing system 282 may include mobile device 280's phone number, international mobile subscriber identity (IMSI), International Mobile Station Equipment Identity (IMEI), and/or the unique serial number or identifier (integrated circuit card identifier or ICCID) associated with the subscriber identification module (SIM) card within Mobile Device 280. For new devices, records are added to the billing system 282 as part of the activation process.

The drawing also shows a point of sale (POS) system 283. At a high level, the POS 283 is a computer system that processes information in support of or in relation to in-store sales, at store facilities of the carrier and/or stores of other parties with whom the carrier may have a particular contractual arrangement to sell mobile devices for service on the network 220. The example of the system also includes an activation system proxy 285 for processing mobile device orders for the carrier enterprise, e.g. orders handled through the POS system 283. The proxy 285, for example, is system that supports automated activations of pending activation orders. The element 285 in the example is a proxy service that enables interface to various billing and POS systems.

For a large carrier with substantial numbers of both prepaid and postpay customers, the system 200 may include an additional billing system 287 for prepaid services. In such a case, the system 287 manages accounting related activities (e.g. account funding) for prepaid customers device usage and serves as a "system of record" storing device and account information for those devices that utilize network services on a prepaid basis.

In the example, the carrier that operates the network 220 offers network services on both a postpay basis and a prepaid basis. In support of the prepaid service plan, the carrier's system 200 includes a prepaid server to manage the customers' prepaid accounts. An example of a suitable platform for the prepaid server 290 is the SurePay® from Lucent Technologies, although other similar platforms may be used or generic platforms may be programmed to operate as the prepaid server. The prepaid server 290, for example, authenticates and validates devices that use prepaid plans and deducts monies for usage amounts from prepaid account balances, for voice telephone calls, messaging services, packet data communication services and the like provided through the network 220 on a prepaid basis. The prepaid server 290 also controls authorization of device services so as to enforce limits on service usage, e.g. to terminate usage if the prepaid balance is exhausted. Notification messages may also be sent to prepaid customers about the remaining balance level, e.g. when the balance falls to or below a threshold, as a warning prior to the limit and thereby to encourage the user to replenish the balance by making a new payment to the carrier. Operations of the prepaid server 290 are coordinated with the relevant account records in the prepaid billing system 287.

eTNI 292 is an enterprise Telephone Number Inventory database that stores information associated with telephone numbers of mobile devices, UICC or SIM information for the cards associated with the mobile devices and pertinent current state information. Thus, for example, the eTNI 292 includes a table that maps IMSI to SIM card ICCID's. The eTNI database 292 also includes a table that is used to assign a telephone number to a SIM card ICCID. For pre-provisioned SIMS, the eTNI database will also list ranges of ICCIDs and IMSIs that manufactures will assign to SIMs for the carrier's customers as "pre-provisioned." The eTNI database will also indicate a state of each SIM card. At manufacture, the original equipment manufacturer (OEM) will assign ICCIDs and IMSIs from the pre-provisioned ranges to particular SIMS and load such data as needed into the SIMS. The OEM will also send the IMSI and encryption keys associated with the pre-provisioned SIM to the carrier equipment, e.g. to provisioning system 289.

Mobile Telephone Administration System (MTAS) is an example of the provisioning system 289. If implemented by MTAS or a similar system, the provisioning system 289 may be an intelligent highly configurable suite of applications responsible for provisioning all types of subscriber devices and their services on the carrier' particular network equipment. The provisioning system 289 is responsible for communicating with other portions of system 200 to provide data to enable activation of the mobile device 280. The portal 226 triggers a procedure to provision a mobile device 280 on the network, for example, by providing appropriate information and/or instructions to the provisioning system 289. the provisioning system 289 receives requests to activate mobile device 280, for example, from the portal 226; and in response, the provisioning system 226 supplies data to other system components so as to enable service for the mobile device 280 on the network. The provisioning system 289 may also provide notification(s) of status of various provisioning tasks back to the portal 226, for example, so that the portal 226 can notify the user of progress and/or that activation of mobile device 280 is complete.

The drawing also shows a number of other elements that may be provisioned for service of the mobile device 280 as part of the self-activation process. The system 200, for example includes a home location register (HLR) 293 for a legacy third generation (3G) network technology, such as for a code division multiple access (CDMA) or Global System for Mobile (GSM) type radio access network. Although the network 200 is described above as a 4G LTE network, the carrier may also operate a legacy network, e.g. in areas where the carrier has not yet deployed 4G LTE equipment and/or to service legacy mobile devices that do not have 4G LTE capability. The HLR performs authentication and authorization related functions in the 3G legacy network similar to functions of the HSSs discussed above. For those purposes, the HLR 293 stores a customer profile record for each active mobile device. The provisioning for the mobile device 280, as part of the self-activation, may therefore involve adding a customer profile record for the device 280 to the HLR 293.

As outlined earlier, the DRA-SLF 225 facilitates the function of routing signaling traffic for authentication and authorization traffic to appropriate HSS platforms 223, as mobile devices seek and use packet-based communication services through the mobile communication network 220. In normal operations for activated mobile devices, the HSS platforms 223 in turn respond to queries so as to enable control of sessions for activated mobile devices through the network 220. The DRA-SLF 225 maintains a list of mobile devices that have been activated with data mapping the mobile device identifiers to the appropriate ones of the HSS platforms 223. To be fully activated on the network 220, a mobile device must have a record in the mapping table of the DRA-SLF 225 as well as a record in an HSS 223 that indicates policies and service permissions applicable to the particular mobile device. If a telephone number of a mobile device is not stored in DRA-SLF, then this indicates that the mobile device with that telephone number has not been activated. If a request for establishment of an IP session from mobile device 280 is received by DRA-SLF 225, and the UUICC credentials for the device/SIM are not provisioned in the DRA-SLF 225, then the DRA-SLF 225 knows to apply a preconfigured default. Rather than signaling a failure, however, the default configuration causes the DRA-SLF 225 to instruct the applicable network element(s) to signal the self-activation HSS 227 to determine authentication and authorization. Assuming that the SIM in the mobile device 280 is pre-provisioned at the self-activation HSS 227, then the HSS 227 causes the network 220 to route the data session of the mobile device 280 to the self-activation portal 226. The DRA-SLF 225 appears in FIG. 3 so as to show its involvement in provisioning during some steps of various self-activation procedures. Of note, as part of a provisioning for a newly activated mobile device 280, an entry is added to the DRA-SLF 225 for that device identifying the particular one of the HSSs 223 that holds the profile record for that device.

For purposes of discussion of provisioning, the drawing also again shows the two types of HSS platforms 223 and 227. As outlined above, the HSSs store databases of profile records for mobile devices 280, used for authentication and authorization purposes as the devices utilize service through the network 220. A pre-provisioned SIM (prior to device activation) has a record in the SA HSS 227, which causes the network to restrict communications of the mobile device to communications with the portal 226. As part of activation, a record for the newly activated device is created in one of the regular call processing HSSs 223. As noted in the discussion of pre-provisioning, when a SIM is manufactured and ready for use, the OEM will also send the IMSI and encryption keys associated with the SIM to the carrier equipment, e.g. to provisioning system 289. The provisioning system 289 will use that data to provision and appropriate record for the SIM into the SA HSS 227. At the end of the provisioning process, provisioning system 289 instructs the SA HSS 227 to delete the record of the pre-provisioned SIM from the service profile record database in the SA HSS 227. The SIM record may be migrated back from the call processing HSS to the SA HSS if the device is de-activated, e.g. as part of a disconnect procedure when service for the device is terminated for some reason.

FIG. 3 also shows a Subscriber Identity Module/Over-the-Air (SIM OTA) 297. In the example, the OTAF or SIM/OTA 297 may be a server connected to the network 220 or 221, to enable the server to communicate with the mobile devices. The SIM OTA server 297 is used to supply provisioning information to the mobile device itself. The mobile device is configured to try to communicate with the SIM OTA 297, for example, whenever the device is booted-up. For an activated device, this may allow the device to replace corrupted data and/or to obtain updates (e.g. a new preferred roaming list) or patches. As part of a self-activation procedure, the provisioning system 289 will provision the SIM OTA server 297 with data that is to be loaded into the mobile device 280. At the end of the activation procedure, the mobile device 280 will be re-booted, which will in part cause the device 280 to communicate with the SIM OTA server 297; and the SIM OTA server 297 will send the appropriate data to the device for installation in the SIM.

In some cases, the provisioning system 289 may communicate directly with elements to provide provisioning data to those elements. In some cases, however, the actual provisioning of network elements may be done via a gateway, e.g. a node provided by an equipment vendor to provision data to network elements that the carrier obtained from that vendor. As an example, provisioning system 289 may communicate with one or more provisioning gateway(s) 295 during the activation process in order to provision an appropriate call processing HSS 223. If multiple vendors provide the network components, for example, a number of vendors provide different HSSs, there may be a different provisioning gateway 295 sold or otherwise supplied to the carrier by each vendor.

The Open Mobile Alliance Device Management (OMA-DM) system 299 is a network platform that performs device management, such as pushing Access Point Names (APNs) and/or software updates to mobile devices.

Figure 4:
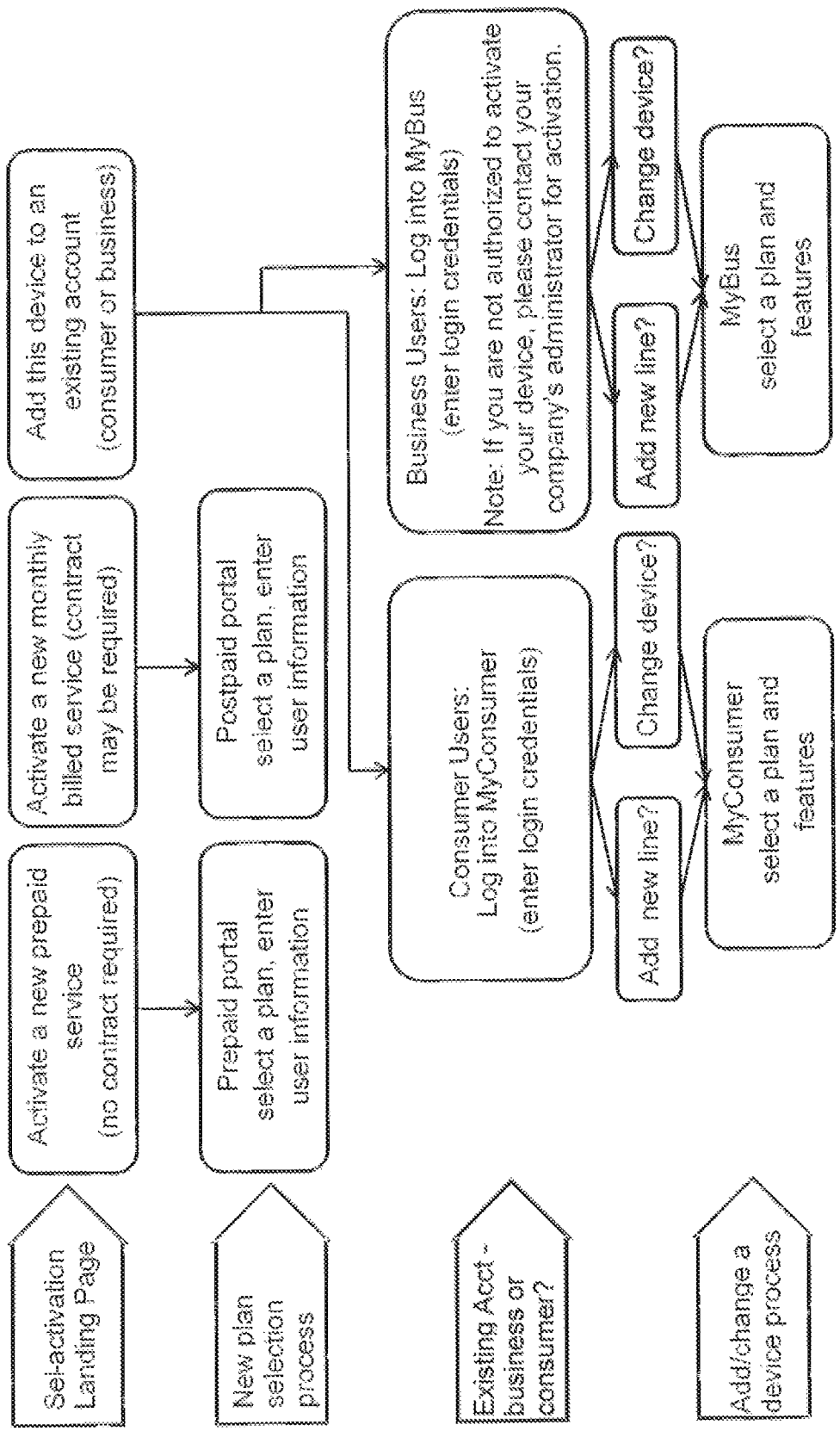
FIG. 4 illustrates options that may be available to the user, as offered by the self-activation portal, for user self-activation of a mobile device.

FIG. 4 provides a high-level logical view of the options that may be offered to a user by the portal 226, during an interactive portion of the self-activation procedure. When a user is redirected to the portal 226 for self-activation, the portal 226 will initially send back a landing page for display to the user on the mobile device 220. As shown along the top line in the drawing, the self-activation landing page in our example offers the user several self-activation options, to activate a new prepaid service, activate a new monthly billed (postpay) service or to add the device to an existing account. The portal will transition to a next page based on a user selection from the landing page.

If the customer selects a new service plan option, the portal logic will transition to one of the new plan selection processes shown in the second line of the drawing. For example, if the user selected prepaid from the landing page, the portal 226 will transition from the landing page to portal pages for prepaid. One or more pages will be sent to the mobile device 280 for display and user inputs will be received, to select a plan and enter any user information needed under the user selected plan.

As another account activation example, if the user selected to open a new monthly account from the landing page, then the portal 226 will transition from the landing page to portal pages for prepaid. One or more pages will be sent to the mobile device 280 for display and user inputs will be received, to select a plan and enter any user information needed under the user selected postpay plan.

The landing page offers the self-activating user options to add the new mobile device 280 to an existing consumer account and to add the new mobile device 280 to an existing business account; and the logic of the portal 226 transitions to the appropriate process shown in the third line of the drawing if the user selects the consumer or business option to add to an existing account from the landing page. In both cases, the user logs into the appropriate account ("MyConsumer" account or "MyBus" account) and selects whether to add a new line (e.g. new MDN) for the device 280 or to change device (e.g. replace an old device on the account with the new mobile device 280). Processing then transitions to an appropriate add/change process shown in the bottom line of the drawing (MyConsumer as an example of a consumer account interface, and MyBus as an example of a business account interface) to allow further account activation activities on the user's existing account.

Figure 5:
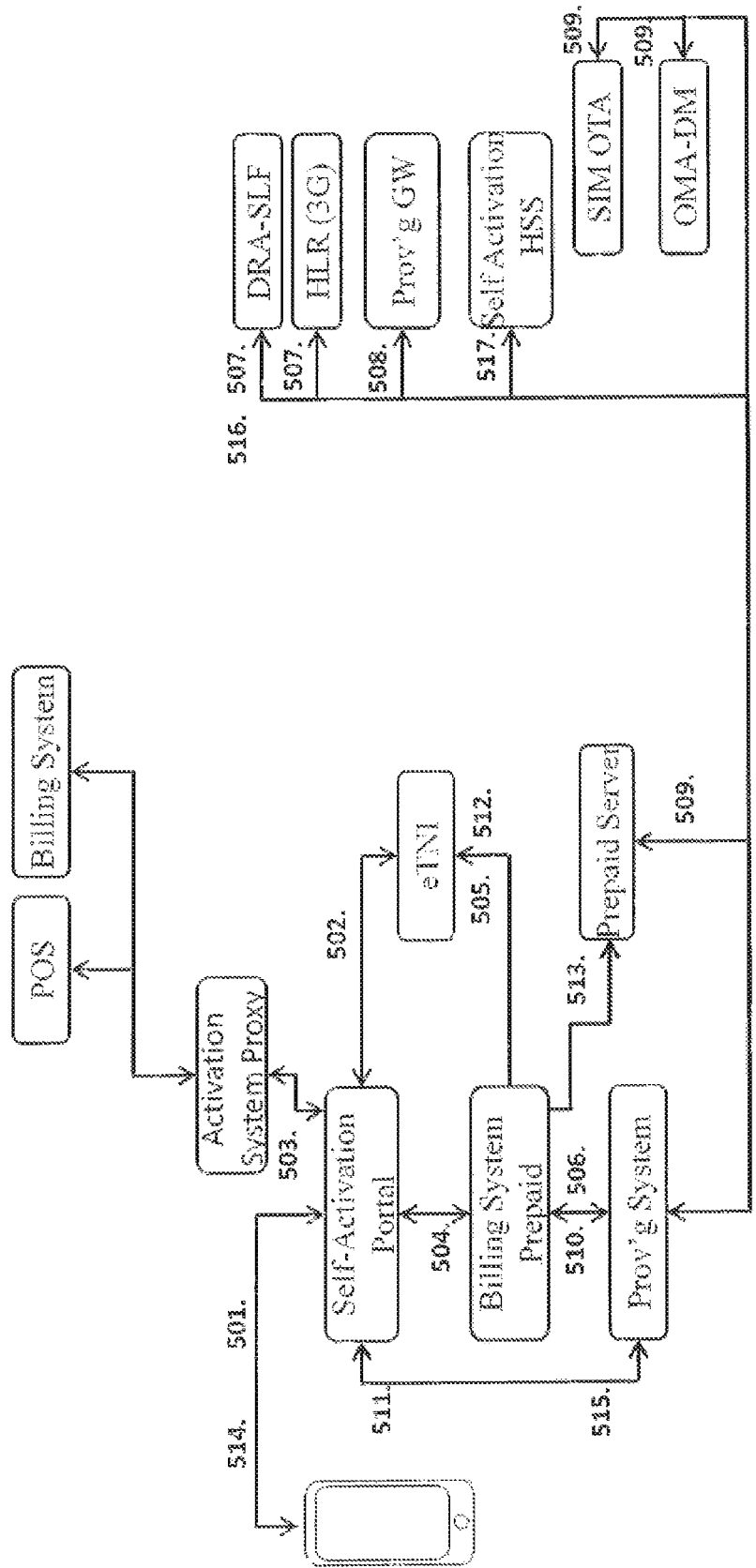
FIG. 5 is a flow diagram of a more specific example of a user self-activation of a mobile device for prepaid service on a network as represented by FIGS. 1 and 3.

FIG. 5 is a flow chart example of a procedure, of the type outlined above, for activating a mobile device for prepaid service on the network 220. Elements involved in the process are shown in FIG. 3 and have been discussed in general above.

In step 501, the network redirects the data session of the mobile device 280 to the portal. As part of the network processing to redirect the session to the portal, the mobile device 280 passes the IMEI and IMSI to the network, which in turn supplies the IMEI and IMSI to the portal. At step 502, the portal queries the eTNI using the IMSI to obtain the SIM's ICCID. In step 503, the self-activation portal calls the activation system proxy, and the activation system proxy calls POS or billing system to release any pending orders. The self-activation portal communicates back to the portal if a pending order has been released, or if not pending order exists.

If no pending orders exist, then in step 504, the customer interacts through the device and the portal to choose a service plan (as outlined above relative to FIG. 4), accepts the terms and conditions, provides email address and establishes login. The self-activation portal submits the order to the billing system that handles prepaid customers account records. As outlined earlier, prepaid service may use the same or a separate billing system. For discussion purposes, the example of FIGS. 5 show a separate billing system for prepaid (similar to 287 in FIG. 3). The order submission includes ICCID, IMEI and selected plan. The billing system for prepaid calls eTNI in step 505 to obtain an MDN. The eTNI, based on the billing system for prepaid requests, moves the MDN and ICCID to AR (Active Reserved) status.

At step 506, the billing system for prepaid sends corresponding provisioning system codes to the provisioning system, with an indicator that the activation request is self-activation. In response, the provisioning system begins steps to provision appropriate data into various network/system elements. At step 507, for example, the provisioning system provisions appropriate records or table entries into the DRA-SLF and the HLR. The DRA-SLF provisioning will include an IMS group associated with the self-activation HSS. In step 508, the provisioning system provisions to the HSS if DRA-SLF provisioning is successful.

In step 509, the provisioning system provisions to SIM OTA, OMA-DM, and prepaid server if provisioning of the HSS via the provisioning gateway is successful. In step 510, the provisioning system returns network element provisioning responses to the billing system for prepaid. In step 511, after SIM OTA provisioning, the provisioning system sends a message back to the self-activation portal indicating that provisioning is successful.

In step 512, the billing system for prepaid, based on positive responses from the network elements, moves the line to RS status and sends a request to eTNI. In our example, RS is the status that shows that the request is sent for activation to the network element(s). Based on the request from billing, the eTNI moves the MDN and ICCID to AI (Active in Use Status).

In the example of FIG. 5, the user has purchased a prepaid account, e.g. upon payment of an amount of funds. Hence, in step 513, the billing system for prepaid funds the bundle on the prepaid server.

In step 514, the self-activation portal sends back applicable messaging to the mobile device or connection manager browser. Once Messaging is completed to the device/browser, then, in step 515, the self-activation portal sends a message to provisioning system that device communication is complete.

In step 516, the provisioning system updates the IMS group to the applicable call processing HSS IMS group on DRA-SLF, and removes the entry on the self-activation HSS in step 517.

Figure 6:
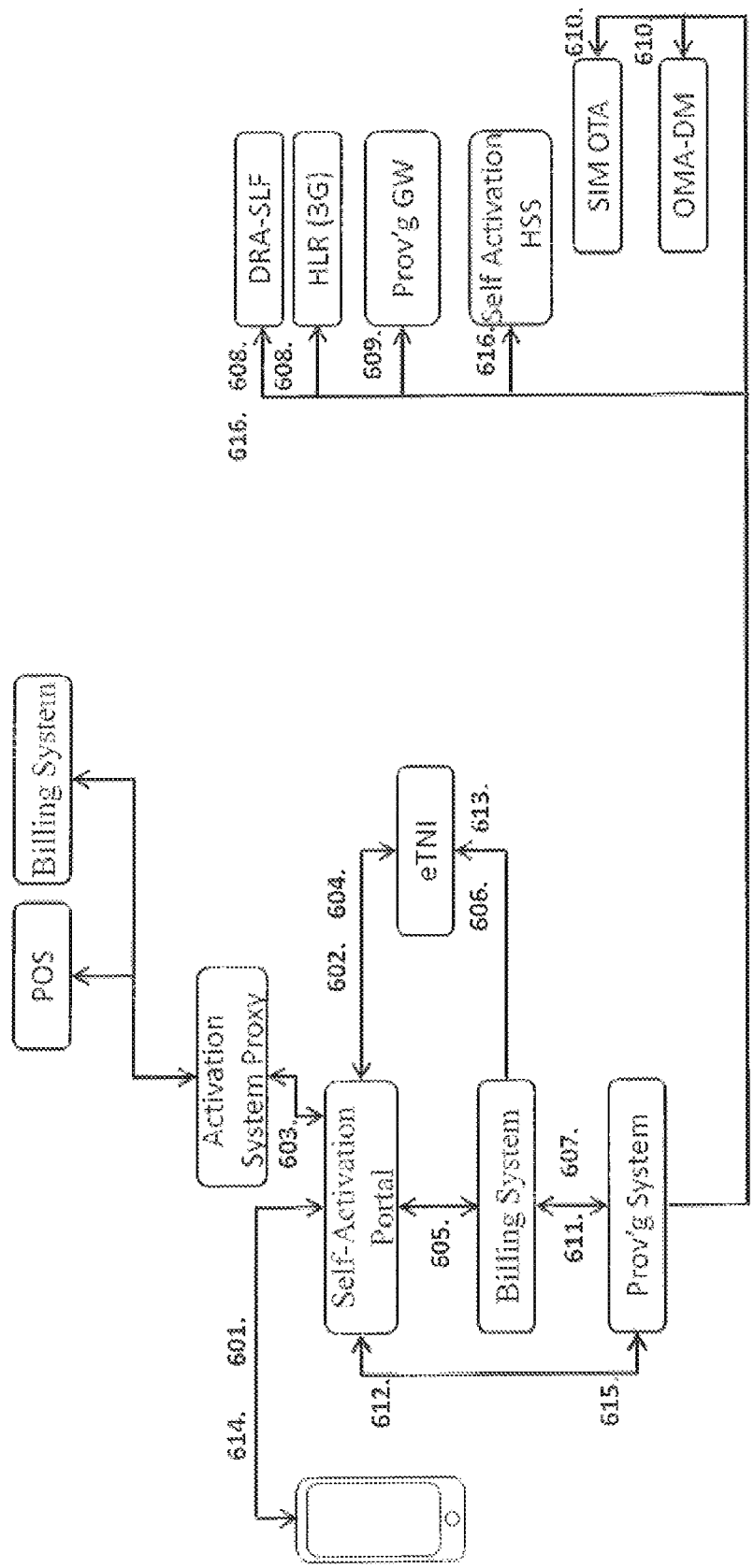
FIG. 6 is a flow diagram of a more specific example of a user self-activation of a mobile device for postpaid service on a network as represented by FIGS. 1 and 3.

FIG. 6 is a flow chart example of a procedure, of the type outlined above, for activating a mobile device for postpaid type service on the network 220. Elements involved in the process are shown in FIG. 3 and have been discussed in general above.

In this example, at step 601, the network redirects the data session of mobile device 280 to the portal. As part of the network processing to redirect the session to the portal, the mobile device 280 passes the IMEI and IMSI to the network, which in turn supplies the IMEI and IMSI to the portal. At step 602, the portal queries the eTNI using the IMSI to obtain the SIM's ICCID. In step 603, the self-activation portal calls the activation system proxy, and the activation system proxy calls POS or billing system to release any pending orders, and communicates back to the portal if a pending order has been released, or if no pending order exists.

If no pending orders exist, then in step 604. the portal requests NPA/NXX from the eTNI. Based on this request, eTNI moves the ICCID and MDN to PA (Pending Activation) status.

At step 605, the customer interacts through the device and the portal to choose a service plan, provides account related detailed information (as outlined above relative to FIG. 4) and accepts the terms and conditions. The self-activation portal submits the appropriate request, e.g. to add a line to an existing account or for a new activation request, to billing system.

At step 606, the billing system revalidates the MDN and ICCID with eTNI. Based on this request eTNI, moves the ICCID and MDN to AR (Active Reserved) status. In step 607, billing system sends corresponding provisioning system codes to provisioning system, with an indicator that the activation request is self-activation. In response, the provisioning system initiates steps to provision appropriate network elements with data to enable service for the mobile device through the network. For example, at step 608, the provisioning system provisions the DRA-SLF and the HLR. The DRA-SLF provisioning will include an IMS group associated with the self-activation HSS.

In step 609, the provisioning system provisions via the gateway, if DRA-SLF provisioning is successful. At step 610, provisioning system provisions SIM OTA and OMADM, if provisioning through the gateway is successful. Then, in step 611, the provisioning system sends network element responses to billing system. Upon receiving positive provisioning responses from the required network elements, billing system moves the record for the effected "line" (MDN) to RS status.

At step 612, the provisioning system sends a message to the self-activation portal, after SIM OTA provisioning, indicating that provisioning is successful. In step 613, billing system sends a transaction to eTNI requesting that the line be moved to AI (Active in use status).

In step 614, the self-activation portal sends back applicable messaging to the mobile device or connection manager browser. Once messaging is completed to the device/browser, then, in step 615, the self-activation portal sends a message to provisioning system that device communication is complete.

In step 616, the provisioning system updates the IMS group to the applicable call processing HSS IMS group on DRA-SLF, and removes the entry on the self-activation HSS in step 617.

The discussion above outlined examples of several procedures for self-activation mostly from the network perspective. It may be helpful to consider briefly how these operations might be implemented so as to provide a desired user experience when activating several different types of mobile devices.

For the purposes of these use case examples, we will assume that the self-activation portal 226 is configured to present the carrier's latest pricing/service options for the respective users based on the type of device that is being activated in each use case. The information available via the portal, for example, includes the options for both prepaid and postpay, which will be determined by the selection the customer makes on the portal landing page.

In a first use case example, assume that a user intends to activate a smartphone. The user may begin the activation process by opening the device's browser while in LTE coverage of network 220, at which time the network will automatically redirect the browser session to the self-activation portal 226. Alternatively, the smartphone may have a device initialization application. As part of that initialization application, a browser application would be launched at the appropriate time in the sequence. Upon reaching the portal 226, the device receives and displays a landing page that offers the user various options, e.g. to add the device to an account, to replace a previous device on an account, to subscribe to a new postpay account, to set-up a prepaid account, etc. Voice, data and messaging service(s) can be setup for the user. Upon successful completion of the accounting input functions, the portal causes the other elements to go through the appropriate provisioning steps as outlined above relative to FIG. 5 or FIG. 6. At the end of the provisioning in the network, the portal sends a notification of successful provisioning to the smartphone for display to the device user. Either automatically in response to the notification or as a result of a manual operation by the user, the smartphone does a reboot. The reboot causes the smartphone device to obtain data from the SIM OTA 297 to complete its activation. Afterwards, the smartphone is fully activated and operational on the network 220.

In another example, we will assume that the mobile device 280 is a tablet. The user may begin the activation process by opening the device's browser while in data network coverage, at which time the browser will be automatically redirected to the self-activation portal 226 as in the earlier examples. Alternatively, the tablet may have a device initialization application. As part of that initialization application, the user may be presented with a choice of whether they would like to enable network service on the device or limit the device's service to WiFi and activate at a future time. If the user selects data network activation, then a browser session would be requested via the network 220, and the network would redirect that session to the portal 226. For the tablet, only data service would need to be setup for the user. Again, the portal would offer the user various options to put the device on an existing account or select an applicable new postpay or prepaid account. Upon successful completion of the accounting input functions, the portal causes the other elements to go through the appropriate provisioning steps as outlined above relative to FIG. 5 or FIG. 6. At the end of the provisioning in the network, the portal sends a notification of successful provisioning to the tablet for display to the device user. Either automatically in response to the notification or as a result of a manual operation by the user, the tablet does a reboot. The reboot causes the tablet device to obtain data from the SIM OTA 297 to complete its activation. Afterwards, the tablet is fully activated and operational on the network 220.

For a user having purchased a USB dongle, the dongle will come with a Connection Manager software program for installation on the PC. When the connection manager software is installed and the USB Dongle is inserted in the PC, it will either launch the PC's browser or the connection manager application can interact with the self-activation portal as a browser to enable account setup. The user begins the process while within data network coverage of the network 220, at which time the browser will be automatically redirected to the self-activation portal 226. Similar to the tablet example, the portal will offer account related options and take inputs to allow selection of an option and implementation of that option. Only data service will need to be setup for the user with the dongle. Again, upon successful completion of the accounting input functions, the portal causes the other elements to go through the appropriate provisioning steps as outlined above relative to FIG. 5 or FIG. 6. At the end of the provisioning in the network, the portal sends a notification of successful provisioning to the smartphone for display to the device user. Either automatically in response to the notification or as a result of a manual operation by the user, at least the dongle does a reboot. The reboot causes the device to obtain data from the SIM OTA 297 to complete its activation. Afterwards, the dongle is fully activated and operational on the network 220.

In another example a user may have purchased a Jetpack—a WiFi hotspot that uses cellular connectivity for its broadband Internet access. Typically, a Jetpack does not have an associated HTML browser, therefore setup can use a PC or the like connected to the 802.11 session with a PC with a browser that can complete the activation. When the attached PC launches its browser, the self-activation process will begin as the browser will be redirected to the self-activation portal. Further operations are then similar to those discussed above relative to the tablet or dongle examples.

More recently, a number of different types of devices are coming on the market configured to use 4G LTE connectivity of a network like 220. These other types of "connected devices" however, are not necessarily configured as smartphones or tablets, from the user's perspective; and/or the devices operate to provide other types of functions only some of which may involve communication over the network 220. Examples include network connected cameras. For devices that do not have sufficient user interface capabilities, they may be activated by connection with an appropriate device, like a PC, and follow procedures similar to those discussed above relative to the dongle or Jetpack.

Another example of a connectable device is a laptop computer with an embedded LTE modem. In this case a network pre-provisioned 4G SIM would be inserted in the laptop's SIM port. After this, the user may begin the activation process by opening the PC's browser while in data network coverage of network 220, at which time the browser will be automatically redirected to the self-activation portal 226. Alternatively, the PC may launch a device initialization application when it identifies the presence of a SIM. As part of that initialization application, the user may be presented with a choice of whether they would like to enable service of network 220 on the device or limit the device's service to WiFi and activate at a future time. Only data service will need to be setup for the user. When the user opts to activate, the procedure for activating service for a laptop computer with an embedded LTE modem would be similar to the procedure for the tablet outlined earlier.

Figure 7:
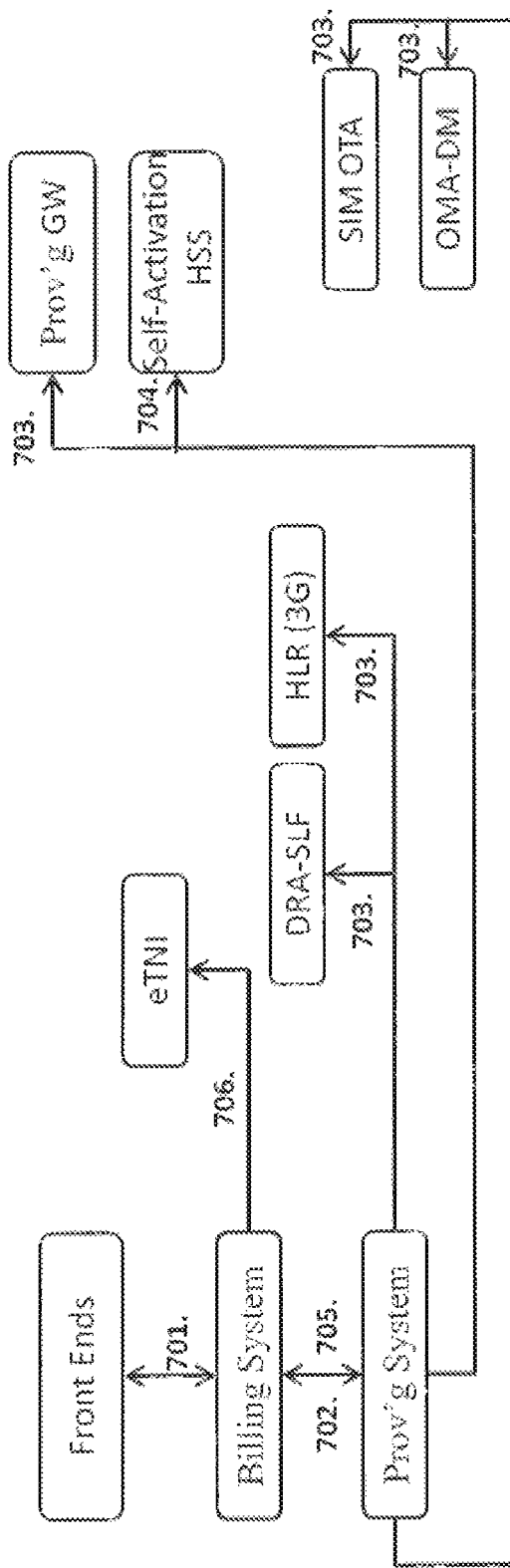
FIG. 7 is a flow diagram of an example of a disconnect operation, e.g. to terminate service, on a network as represented by FIGS. 1 and 3.

FIG. 7 is a flow chart example of a procedure in which the system 200 effectively 'disconnects' service with respect to a particular mobile device, utilizing procedures somewhat complementary to the procedures of FIGS. 5 and 6 and utilizing some of the elements as shown in FIG. 3.

In the example, step 701 involves one of the front ends, such as POS, a My Business web site, sending a disconnect request to billing system. In step 702, billing system sends the disconnect request to provisioning system with applicable provisioning codes. At step 703, provisioning system disconnects the subscriber by sending instructions to delete previously provisioned data for the device from the DRA-SLF, HLR, IMS Core, SIM OTA and OMA-DM. In step 704, however, the provisioning system provisions the subscriber to the self-activation HSS. In this way, the device may be re-activated in future via one a procedure like one of those discussed above relative to FIGS. 5 and 6.

At step 705, the provisioning system sends network element responses to billing system indicating disconnection has been implemented at the relevant network elements. Based on receiving positive provisioning responses from the required network elements, billing system moves the line/MDN for the device to deactivated status. In 706, billing system sends a transaction to eTNI; and in response, eTNI moves the SIM identifier(s) and the MDN to AG (Aging) status. In that status, the SIM may be re-activated for a set aging period of time.

As shown by the discussion of self-activation above, a variety of the functions involved are implemented on network elements, carrier operated data equipment and/or mobile devices. Although special purpose devices may be used, some or all of the network elements and/or carrier operated data equipment also may be implemented using one or more hardware platforms intended to represent a general class of data processing device commonly used to run "server" programming so as to implement the self-activation related functions discussed above, albeit with an appropriate network connection for data communication. Although the example of the mobile device discussed in the most detail above included user interface elements, the self-activation technique may also apply to other types of mobile devices (e.g. a jetpack or USP dongle). For such another device activation, the mobile device that is being activated may be connected (at least temporarily) to other user equipment that provides the user interface. Such other user equipment, for example, may be a user terminal type of general purpose computer.

FIG. 8 provides a functional block diagram illustration of a general purpose computer hardware platform. More specifically, FIG. 8 illustrates a network or host computer platform, as may typically be used to implement a server, such as any of the servers/platforms implementing the portal and the activation related functions shown in FIG. 3. FIG. 9 depicts a computer with user interface elements, as may be used to implement a personal computer or other type of work station or terminal device, although the computer of FIG. 9 may also act as a server if appropriately programmed. It is believed that the general structure and general operation of such equipment as shown in FIGS. 5 and 6 should be self-explanatory from the high-level illustrations.

A server, for example, includes a data communication interface for packet data communication (see FIG. 8). The server also includes a central processing unit (CPU), in the form of one or more processors, for executing program instructions. The server platform typically includes an internal communication bus, program storage, and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. The software programming relating to the self-activation techniques discussed herein may be downloaded and/or updated from a computer platform, for example, from a management server or the like via a network for installation in the portal, in a provisioning system, etc.

A computer type user terminal device, such as a PC or tablet computer, similarly includes a data communication interface CPU, main memory and one or more mass storage devices for storing user data and the various executable programs (see FIG. 6). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of self-activation and related communications outlined above may be embodied in programming. Program aspects of the technology may be thought of as "products" or "articles of manufacture" typically in the form of executable cods and/or associated list data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory or tangible storage media, more general terms such as computer or machine "readable medium" refer to any medium that participates in providing instructions to a processor for execution.

As shown by the examples discussed above, the technique for self-activation of SIMs begins with a mobile device that contains a pre-provisioned SIM in which provisioning system (Mobile Telephone Activation System) has created a corresponding record to the network element, HSS (Home Subscriber Server) for Self-Activation (SA HSS). The pre-provisioned SIM enables the device to connect to the 4G LTE network with restricted access so that the device can connect only to the self-activation portal to continue the action of self-activation of the mobile device SIM without having the user manually enter device and SIM identification information. The 4G LTE network, in our example, allows the device access to all potential web page IP addresses involved in the subscriber activation process prior to completion of the self-activation process. Upon completion of the self-activation process, the user is assigned network credentials (e.g. MDN and/or MSISDN) to fully activate the user's mobile device, and the SIM record in the SA HSS network element is migrated to the regular call processing HSS network element. However, the SIM record in the SA HSS network element is deleted only after provisioning of a record for that SIM in the regular call processing HSS network element.

Deleting the SIM record in the SA HSS network element effectively prevents the now fully activated mobile device from being able to return to the self-activation portal. By delaying that deletion from the SA HSS network element until after successful migration of the SIM record to the regular call processing HSS network element insures the new mobile device is able to communicate with the portal until it is fully activated on the network, and thereby avoiding a problematic inability to communicate if there were no record for the SIM in any HSS (as might otherwise occur due to an activation interruption if the SA HSS record were deleted before addition of the record to the regular HSS).

The self-activation communication flow allows the portal to complete communication with the mobile device/connection manager. This communication will occur after successful provisioning of the SIM card on the mobile carrier's network, and prior to making provisioning modifications that could prevent communication of successful provisioning to the device. The flow also flow allows for the Broadband portal to communicate with the device that provisioning is successful, and a power cycle of the device can be performed to complete SIM programming, prior to removing it from the network element, SA HSS.

Customer satisfaction may be improved because the powering off and powering on of the mobile device as the final step in self-activation would result in the expected experience, which is connection to the network and successfully being able to use the mobile device for normal services. The approaches outlined above may also reduce calls into the carrier's customer care center(s) for scenarios where a mobile device does not receive required communication from the self-activation portal, and the customer has to go into a store or call customer care to resolve the issue.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, rating, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising the steps of:
receiving in a mobile communication network an initiation of data communication between a mobile device including an identity module and the network while the mobile device is not presently activated for service by the network and the identity module is pre-provisioned for restricted service by the network;
directing, by the network and based on a self-activation service control record maintained by a first element of the network, the data communication of the mobile device through the network to a portal of the carrier offering services through the network;
causing the network to allow, based on the self-activation service control record, data communication between the mobile device and the portal through the network and, while the mobile device remains un-activated, prevent, based on the self-activation service control record, other communication of the mobile device through the network;
via the allowed data communication through the network, collecting information from the user to enable billing for the other data communication once the mobile device is activated on the network;
automatically collecting from the mobile device, via the allowed data communication, information including an identifier for the mobile device;
provisioning data to a second element of the network different from the first element of the network, to activate service for the mobile device through the network, using at least some of the collected information, the data including a new service control record to allow the other communication of the mobile device through the network; and
upon successful completion of the provisioning of the data to the second element of the network:
sending a message from the portal informing the mobile device that network activation is complete; and
deleting, from the first element of the network, the self-activation service control record that facilitated the direction of the communication from the mobile device to the portal.

2. A method according to claim 1, wherein:
the message sent before the self-activation record is deleted causes the mobile device to communicate over the air through the network to obtain device provisioning data to complete activation at the device; and
the method comprises, subsequent to receiving the over the air communication from the mobile device, permitting the other communication of the mobile device through the network.

3. A method according to claim 1, wherein:
the identity module is a subscriber identity module (SIM);
the automatically collecting step includes the portal automatically obtaining data from the network including at least one identifier associated with the SIM; and
the provisioning step utilizes the data automatically obtained from the network.

4. A method according to claim 1, wherein:
the network is a fourth generation (4G) Long Term Evolution (LTE) network;
the first element of the network is a self-activation home subscriber server (HSS) of the 4G LTE network;
the second element of the network is a regular session processing HSS of the 4G LTE network;
the provisioning step comprises provisioning the new service control record to the regular session processing HSS; and
the deleting step comprises deleting the self-activation service control record from the self-activation HSS.

5. A method according to claim 4, wherein the provisioning step further comprises provisioning a data entry for the mobile device to a subscriber location function (SLF) of the 4G LTE network identifying the regular session processing HSS.

6. A method according to claim 5, wherein:
the SLF lacks a data entry for the mobile device prior to the provisioning step; and
the directing step comprises:
the SLF directing signaling regarding the set-up of the data communication to the self-activation HSS instead of any regular session processing HSS of the 4G LTE network, and
the self-activation HSS causing the 4G LTE network to redirect the data communication to the portal.

7. A system comprising:
a mobile communication network;
a self-activation subscriber server storing self-activation service control records for pre-provisioned subscriber identity modules (SIMs) for mobile devices not presently activated on the mobile communication network,
one of self-activation service control records, for a respective pre-provisioned SIM, being configured to enable the mobile communication network to permit a mobile device identified via the respective SIM only restricted communication through the mobile communication network;
a regular session processing subscriber server, configured to store service control records for activated mobile devices;
a computer platform implementing an online portal that receives the restricted communication from the identified mobile device through the mobile communication network, wherein the computer platform is configured to implement functions of the portal, including functions to:
collect information from a user of the identified mobile device to enable billing for subsequent communication through the network, once the identified mobile device is activated on the mobile communication network;
automatically receive information identifying the respective SIM;
trigger provisioning of data to one or more elements of the mobile communication network, to activate service for the identified mobile device through the mobile communication network, using the collected information, the provisioning of data including provisioning a new service control record for the respective SIM to the regular session processing subscriber server;
upon successful completion of the provisioning of the data to the one or more elements of the mobile communication network, send a message from the portal informing the identified mobile device that network activation is complete; and after the message is sent to the mobile device, initiate a process to delete the self-activation service control record for the identified mobile device from the self-activation subscriber server.

8. The system according to claim 7, wherein the one or more elements of the mobile communication network to which data is provisioned include two or more of:
a telephone number inventory database;
a billing system;
the regular session processing subscriber server, configured to store service control records for activated mobile devices; and
an over-the-air server system configured to communicate data via the network for installation into the respective SIM.

9. The system according to claim 8, wherein:
the communication network is a fourth generation (4G) Long Term Evolution (LTE) network;
the subscriber servers are home subscriber server platforms of the 4G LTE network; and
the 4G LTE network further comprises a subscriber locator function (SLF), configured to route signaling communications for sessions of activated mobile devices to one of the HSSs storing service control records for activated mobile devices and to route signaling communications for sessions of un-activated mobile devices to the one of the HSSs storing service control records for pre-provisioned SIMs.

10. The system according to claim 8, wherein the message from the portal informing the identified mobile device that network activation is complete causes the identified mobile station to communicate over the air through the network with the over-the-air server system to obtain device provisioning data for the respective SIM, to complete activation at the identified mobile device permitting the communication of the identified mobile device through the network as an activated mobile device.

11. A computer platform comprising:
a network interface coupled to a mobile communication network;
a processor coupled to the network interface;
a memory accessible to the processor; and
programming stored in the memory, wherein execution of the programming by the processor configures the computer platform to implement online portal functions, including functions to:
receive, via the network interface and from a mobile device not presently activated for service by the network including an identity module pre-provisioned for restricted service by the network, a communication having been network restricted based on a self-activation service control record for the pre-provisioned identity module maintained by a first element of the network; and
responsive to receipt of the network restricted communication:
collect information from a user of the mobile device to enable billing for subsequent communication through the network, once the mobile device is activated on the mobile communication network;
automatically collect, via the network interface and from the mobile device, information including an identifier of the mobile device;
trigger provisioning of data to a second element of the mobile communication network different from the first element of the network, to activate service for the identified mobile device through the mobile communication network, using the collected information, the data including a new service control record;
upon successful completion of the provisioning of the data to the second element of the mobile communication network, send a message informing the identified mobile device that network activation is complete; and
after the message is sent to the mobile device, initiate a process to delete the self-activation service control record for the pre-provisioned identity module.

12. The computer platform of claim 11, wherein:
the function to automatically collect information from the mobile device includes a function to obtain, from the mobile communication network and based on the automatically collected information, data including at least one identifier associated with the pre-provisioned identity module of the mobile device; and
the function to trigger provisioning utilizes the obtained data.

13. The computer platform of claim 11, wherein:
the function to trigger provisioning comprises a function to provision the new service control record to a regular session processing home subscriber server (HSS), the regular session processing HSS being the second element of the mobile communication network; and
the initiated process to delete the self-activation service control record for the pre-provisioned identity module comprises a function to initiate deletion of the self-activation service control record from a self-activation HSS, the self-activation HSS being the first element of the mobile communication network.

14. The computer platform of claim 13, wherein the function to trigger provisioning further comprises a function to provision a data entry for the mobile device to a subscriber location function (SLF) of the mobile communication network identifying the regular session processing HSS.

* * * * *